United States Patent Office
3,671,190
Patented June 20, 1972

3,671,190
SYNTHETIC CLAY-LIKE MINERALS OF THE SMECTITE TYPE AND METHOD OF PREPARATION
Barbara Susan Neumann, Redhill, England, assignor to Laporte Industries Limited
No Drawing. Continuation of abandoned application Ser. No. 664,298, Aug. 30, 1967. This application Nov. 10, 1970, Ser. No. 88,394
Int. Cl. C01b 33/22
U.S. Cl. 23—111                 14 Claims

ABSTRACT OF THE DISCLOSURE

Synthetic clay-like mineral of the smectite type having the general structural formula

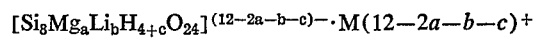

and having (i) M as a sodium, a lithium or an equivalent of an organic cation
(ii) the value of $a$, $b$ and $c$ such that either $$a<6;\ b>0;\ c>0$$

and $$b+c<2;\ \pm(a+b+c-6)<2$$

or $$a<6;\ b=0;\ \pm c<2$$

and $$\pm(a+c-6)<2$$

(iii) a cation exchange capacity of about 50 to 120 meq./100 g.
(iv) when M is Na$^+$ or Li$^+$, a Bingham yield value of at least 40 or 50 dynes/cm.$^2$ as a 2% dispersion in tapwater.

REFERENCE TO RELATED APPLICATION

This application is a continuation of application Ser. No. 644,298, filed Aug. 30, 1967, and now abandoned.

BACKGROUND OF THE INVENTION

The invention relates to novel synthetic clay-like minerals, especially swelling clays, and relates to processes for their manufacture and to compositions containing them.

Most clay minerals, as found naturally, are in an impure state and the complete purification of some is difficult and expensive and, in some cases, impossible. Further, there are occasions on which the supply of a clay mineral of a particular chemical composition, either pure or impure, is insufficient. Thus, it is desirable to be able to manufacture synthetic clay-like minerals in a substantially pure form.

It is of particular interest to be able to manufacture synthetic clay-like minerals having rheological properties similar to or better than those of hectorite, as natural hectorite has valuable properties but large quantities of hectorite are not available. In any event natural hectorite is mixed with impurities the removal of some at least of which is extremely difficult.

To our knowledge, only two methods are known for synthesising hectorite-type clay minerals and which are capable of yielding more than a few milligrams of product under conditions which are feasible on a commercial scale. One method is described by Granquist and Pollack in Clays and Clay Minerals, Natl. Acad. Sci., Natl. Res. Council Publ. 8, 150–169 (1960) and the other is described by Strese and Hofmann in Z. Anorg. Chem. 247, 65–95, 1941. It is not possible, by either of these methods, to obtain products that are entirely pure. Thus, the product of Strese and Hofmann's method contains a high proportion of amorphous silica or silicate and some crystalline silica, or quartz. The removal of the amorphous substance is impossible and any product obtained by this method necessarily contains such a high amount of impurity that the rheological properties of aqueous dispersions of the product are adversely affected. The product obtained by the method described by Granquist and Pollack contains some magnesium hydroxide. The removal of this is difficult and it is probably impossible to remove it all. It is known that the presence of even quite small amounts of magnesium hydroxide harms the rheological properties of aqueous dispersions of clay minerals.

Many clay-like minerals contain fluoride but however much they are purified there is always a risk that some fluoride may be extracted from the mineral during certain uses. This is a great disadvantage in, for example, pharmaceutical and cosmetic preparations. The present invention is of particular value in that it readily permits the production of fluoride-free clay-like minerals, and moreover, such swelling clays which are fluoride-free.

In this respect the invention represents an improvement over the invention of our copending application Ser. No. 651,107 filed July 5, 1967, now U.S. Pat. No. 3,586,478. That invention provides novel synthetic clays which are swelling clays having far superior swelling properties over natural swelling clays and any known synthetic swelling clay. They are thus very useful in many ways but, since they contain fluoride, not always in the cosmetic and pharmaceutical fields.

The synthetic swelling clays of the present invention have swelling properties even greater than those of our earlier invention. This is indeed surprising since it was critical in the process of our earlier invention to employ fluoride-containing materials, it being critical to employ above a certain minimum level. However we have now discovered a process whereby fluoride-containing materials are not required, the clay products have excellent properties and, of course, can be used in the cosmetic and pharmaceutical fields as well.

DETAILED DESCRIPTION OF THE INVENTION INCLUDING PREFERRED EMBODIMENTS

According to the invention we synthesise a clay-like mineral by coprecipitation from a solution containing all the cations and anions that we desire to be present in the mineral and which is maintained at a pH of at least 8, and we then heat the coprecipitated product, without washing it free from soluble salts, under pressure. The pressure and temperature and duration of the heating must be sufficiently great to bring about crystal growth but not so great that the crystals become larger than is desired. Preferably the pH does not exceed 12.5, and is desirably from 8.5 to 9.5, advantageously about 9. An essential difference between this process when applied to the production of materials similar to that of hectorite, and the known processes described above is that in our process all the materials to be present in the clay-like mineral must be present during the coprecipitation steps.

A wide variety of synthetic clay-like minerals may be prepared by the process of the invention. One class of natural clay minerals are the smectites, including montmorillonite, beidellite, nontronite, sauconite, saponite and hectorite. The elementary structure of these minerals may be based on that of the two end members of the series which are themselves not clay minerals, pyrophyllite, $Si_8Al_4O_{20}(OH)_4$, and talc, $Si_8Mg_6O_{20}(OH)_4$. In clay mineral structures some at least of the silicon, aluminium or magnesium and hydroxyl ions are replaced by other ions. As a result of the first two types of substitution the structure shown may acquire a negative charge, which is neutralised by associated exchangeable cations, frequently alkali metal cations. Thus, the silicon may be replaced by aluminum, the aluminum by ferrous iron or magnesium, the magnesium by lithium and the hydroxyl by fluoride. In natural hectorite part of the magnesium is generally replaced by lithium and a minor part of the hydroxyl is replaced by fluoride. Sometimes part of the silicon is replaced by aluminium. Clay-like minerals having X-ray diffraction patterns similar to those of any of these compositions may be made by the process of the invention, by introducing into the solution from which coprecipitation occurs substantially stoichiometric amounts of silicon, magnesium, and any lithium and aluminium or other ion desired in the composition, together with sufficient alkali metal compound, generally the carbonate or hydroxide, to maintain the solution at the desired alkaline pH throughout. The process is of particular value in that we are now able to synthesise a new class of synthetic clay-like minerals having X-ray diffraction patterns similar to those of natural hectorites. However, aqueous dispersions of our new clay-like minerals have rheological properties that are much better than those of natural clays of similar X-ray diffraction patterns.

One vital property of a useful swelling clay is characterised by the Bingham Yield Value possessed by an aqueous dispersion of the clay. The term Bingham Yield Value (also known as Bingham Yield Stress, these terms being alternatives for precisely the same property) is referred to in such standard works on rheology as "Rheology Theory and Applications," ed. F. R. Eirich (Acad. Press) vol. 1 (1956) p. 658; "Colloidal Dispersions," L. K. Fischer (N.Y. Bureau of Standards), 2nd ed. 1953, pp. 150–170, and "The Chemistry and Physics of Clays and Other Ceramic Materials," 3rd ed., p. 463, A. B. Searle and R. W. Grimshaw. The term may be defined as the shear stress which has to be exceeded before the rate of shear shows a linear relationship to the shear stress, the former being proportional to the difference between the shear stress and the Bingham Yield Value.

The Bingham Yield Value is determined by first obtaining a flow curve relating the shear stress to the rate of shear, and then extrapolating the straight line section of the curve to the shear stress axis; the intercept is the Bingham Yield Value. It can be conveniently determined on any viscometer capable of measuring a range of shear rates and shear stresses. In the experimental work quoted in the present specification a Fann rotational viscometer was used in the manner set out in the book "Oil Well Drilling Technology" by A. W. McCray and F. W. Cole, Union of Oklahoma Press, pp. 94–96 (1958). When measured on this instrument the results are in the unit of dynes/cm.$^2$ will be used. As is well known, to convert lbs./100 sq. ft. to dynes/cm.$^2$ a multiplication factor of 4.8 must be used.

Preferred novel synthetic clay-like minerals have the general structural formula $$[Si_8Mg_aLi_bH_{4+c}O_{24}]^{(12-2a-b-c)-} \cdot M(12-2a-b-c)+$$

having (i) M as a sodium, a lithium or an equivalent of an organic cation
(ii) the value of $a$, $b$ and $c$ such that either $$a<6;\ b>0;\ c>0$$

and $$b+c<2;\ \pm(a+b+c-6)<2$$

or $$a<6;\ b=0;\ \pm c<2$$

and $$\pm(a+c-6)<2$$

(iii) a cation exchange capacity of about 50 to 120 meq./100 g.
(iv) when M is $Na^+$ or $Li^+$, a Bingham Yield Value of from about 50 to 250 dynes/cm.$^2$ as a 2% dispersion in tapwater.

The relationships between $a$, $b$ and $c$ quoted above are a "shorthand" way of signifying that in all cases the number of magnesium ions per unit cell of crystal is less than six and the total number of octahedral ions does not differ from six by more than two. If there is lithium present, the total number of hydrogen ions, including those normally assumed to be present as hydroxyl, is greater than or equal to four and the total number of octahedral ions other than magnesium is less than two. If lithium is absent, the total number of hydrogen ions may not differ from four by more than two.

The Bingham Yield Values quoted above relate to values in tap water. However it is the case that the Bingham Yield Value of the synthetic clay dispersions depends to a large extent on the concentration and type of electrolytes present in water. The general effect is such that addition of electrolyte to a dispersion of synthetic clay made in distilled water or tap water at first increases then decreases the BYV. The maximum value, obtained at optimum electrolyte concentration is several times higher than that prevailing in dispersions made in the local tapwater. This effect will be illustrated hereinafter.

In addition to being free from fluorides, the new materials according to the invention are substantially pure, being substantially free of magnesium hydroxide, amorphous silica or silicate and other impurities. By substantially pure we mean that the clays are either wholly free of the impurities or only contain such small amounts that the rheological properties of aqueous dispersions of the materials are not seriously affected, the preferred materials, having the structural formula given above, still having a Bingham Yield Value, as a 2% dispersion in water, of at least 40 or 50 and preferably at least 75 dynes/cm.$^2$. The materials may contain, at the most, 5 to 10% by weight impurities but the impurities will always be such and the amounts of them will be such that X-ray analysis does not reveal their presence. Thus, any impurities that are present in more than trace quantities will be amorphous.

In this specification we always mean that the Bingham Yield Value is the value obtained on a dispersion made by dispersing 2 gm. of the material in 100 ml. hot water and allowing the dispersion to cool.

The Bingham Yield Values, of at least 40 or 50 and generally of at least 75 dyne/cm.$^2$, compare with values of less than around 15 dyne/cm.$^2$ for products made by the process of Granquist and Pollack even when magnesium hydroxide originally present in the product has apparently all been removed, based on the evidence of X-ray analysis, and for the products prepared by the method of Strese and Hofmann and for naturally occurring hectorite. The crystal structure of the new materials as determined by X-ray analysis is similar to that of natural hectorite and it is not possible to identify, by readily available experimental methods, exactly what the characteristics are of the microstructure and chemical composition of our new materials that results in them having such high Bingham Yield Values when dispersed in water. However, by choosing appropriately the proportions of the components in the solution from which the clays are coprecipitated, and thus the ratios of the atoms in the materials, and the conditions of the process synthetic materials having Bingham Yield Values even greater than 75 dyne/cm.$^2$ may readily be obtained. Thus, synthetic materials having Bingham Yield Values of more than 100, and often more than 150 and sometimes even more than 250 dyne/cm.$^2$ may be obtained, especially in the materials containing lithium. These values are as 2% dispersions in tap-water. The values can be increased as discussed above the preferred new clay-like minerals have a very high specific surface area. Generally, it is at least 100 sq. m./gm. and often 350 sq. m./gm., or more, although clearly it should not be too high. This compares to a value of around 70 sq./gm. for natural hectorite.

From a study of the structural formula given above for the preferred new synthetic materials it will be appreciated that it is contemplated that there may be more or fewer hydrogen atoms than the four required for the four hydroxyl groups that would be expected to be present in a fluoride-free hectorite molecule according to the traditional concept of smectite structure. The evidence for this possibility is based on the fact that many of the preferred materials have a cation exchange capacity which could not be reconciled by the conventional formula, although the latter is applicable to natural hectorite or the synthetic hectorites made by the two known processes discussed above. The cation exchange capacity of the preferred materials according to the invention may be, for example, 64 milliequivalents per 100 grams and the chemical analysis equivalent to $Si_8Mg_{5.397}H_xO_{24}Na_{0.483}$ where $x$ is not readily determined by analysis. The cation exchange capacity can only be made to agree with the composition if one assumes that $x=4.723$, i.e. $c=0.723$ according to our formula quoted above. The conventional formula would require a cation exchange capacity of $2(6-5.397=1.206$ equivalents per unit cell, or about 160 milliequivalents per 100 grams which is very much greater than the experimentally measured value. In general, the new materials may have cation exchange capacities falling within the range 40 or 50 to 120 meq./100 gm., normally 60 to 90, and this is highly desirable.

A high proportion magnesium, lithium and silicon ions present in the solution from which the materials are coprecipitated go into the materials formed and accordingly adjustment of the relative ratios of the quantities of these ions will result in variations of the empirical formula of the material formed. The proportion retained is even higher than in the process of our earlier invention and thus represents an even more economical use of materials.

For the production of the preferred, fluoride-free, materials having satisfactory Bingham Yield Values and containing lithium it is preferred that the quantities in the solution should be such that there are from 0.4 or 0.6 to 1.45 lithium atoms per 8 silicon atoms and preferably from 0.6 to 1.2 in Bingham Yield Values of greater than 100 may be obtained in this way. Bingham Yield Values greater than 150 may be obtained with solutions containing from 0.7 to 1.45 lithium atoms per 8 silicon atoms. In the final product it is preferred that the number of lithium atoms per unit cell (i.e. 8 silicon atoms) is around 0.6 to 1.05.

When the solution and the material to be coprecipitated from it are free of lithium also, then it is preferred that there should be fewer than 6 magnesium atoms per 8 silicon atoms in the solution and product. For satisfactory Bingham Yield Values the deficiency of magnesium is preferably at least 0.1 atom per unit cell, but is generally not more than around 1.5 atoms per unit cell. Preferably the deficiency is more than about 0.2 and most satisfactory results are obtained with magnesium deficiencies of from around 0.5 to 1 atom per unit cell with the preferred deficiency being around 0.7. Thus when $b=c$, $a$ preferably equals about 5.3.

Any suitable magnesium and lithium salts may be used for introducing these cations into the solution. Examples are magnesium chloride, magnesium sulphate, magnesium nitrate, and lithium chloride, sulphate and nitrate. The reaction solution must remain alkaline throughout the coprecipitation and so must contain sufficient alkali to neutralise anions liberated during the coprecipitation, for example to neutralise sulphate ions liberated from magnesium sulphate. Thus preferably more than the stoichiometric amount of alkali required to neutralise the anions liberated during the reaction and also the anion of the clay molecule is present. The amount is preferably between the stoichiometric amount and about 3 times the stoichiometric amount, with the preferred amount being about 1½ times.

The coprecipitation is preferably brought about by mixing a hot solution containing the magnesium salt, and any lithium salt that is to be included, with a cold solution containing the silicon. This cold solution generally also contains the alkali. The silicon may be introduced in the form of any suitable silicate. The addition of one solution to the other may be made rapidly or slowly, but we find it satisfactory to make the addition over a period of around 20 minutes.

The properties of the material obtained do not seem to vary much with the concentration of the reactants used, and accordingly the concentration of the precipitate formed. However, for experimental reasons it is generally preferred so to select the concentrations of the reactants that the concentration of precipitate is not more than around 5% by wt. Above this difficulties are experienced in filtering and washing the precipitate.

The precipitate may be boiled after it is formed, and before it is heated under pressure, to facilitate subsequent handling of the precipitate. Particularly it facilitates washing and filtering of the precipitate. Boiling periods of around 4 hours are found to be satisfatcory.

The heating under pressure, conducted in an autoclave, should preferably be at a pressure of at least 100 p.s.i. (170° C.) if lithium is present with suitable pressures of from around 150 to 700 p.s.i. (186° C. to 263° C.). Pressures from 700 to 1000 p.s.i. are advantageous when, as referred to hereafter, an organic derivative is subsequently to be prepared. However, when this is not the case then good results may be obtained with pressures of from 200 to 600 p.s.i. (198° C. to 254° C.). One suitable pressure that we have found is around 400 p.s.i. (231° C.). When lithium is absent the lower pressures mentioned are not entirely satisfactory and in general the pressure has to be at least 250 p.s.i. (207° C.). A suitable range of pressures, when there is no lithium, is 500 to 1000 p.s.i., with a value of around 700 being preferred. However in all cases there is no critical upper limit, and pressures of up to even 3000 p.s.i. may well prove suitable on occasions as a means of reducing the time required for the process. This may then enable a continuous process to be operated, feeding in and bleeding off through suitably constructed and arranged value means.

The autoclaving resutls in crystallisation of the clay-like mineral and if it is continued for too long too much crystallisation occurs and the rheological properties of aqueous dispersions of the product are adversely affected. The autoclaving, especially when at 400 p.s.i., should be continued, however, for at least one hour, but generally eight hours is quite long enough. A preferred duration is around four hours. However, when, as referred to in more detail later, an organic derivative is subsequently to be prepared then it may sometimes be preferred to continue the autoclaving for as much as 24 hours.

The product from the autoclaving is generally a suspension. The solids are usually separated by filtration or centrifuging and washed, for example with water, to remove soluble by-products, such as sodium sulphate, from the coprecipitation. This wet product may then either be used, for example in chemical reaction, as such or it may be dried. The drying may be by, for example, heating at 110° C. for sixteen hours.

In the following examples in accordance with the invention, Examples 1 and 2 demonstrate the production of new materials according to the invention and which have an X-ray diffraction pattern similar to that of hectorite and which are free of fluoride but contain lithium. Example 2 also illustrates the variation in Bingham Yield Value with increase in electrolyte. Example 3 demonstrates that on increasing the lithium content up to 1.75 atoms per unit crystal Bingham Yield Value is decreased and Example 4 shows that lithium contents greater than 2 give no appreciable Bingham Yield Value. Examples 5 and 6 are examples of the production of a material free both of lithium and fluorine. Example 7 illustrates a very high pressure/short time process.

Examples 8 and 9 are present to demonstrate that very poor results are obtained if the coprecipitation is not carried out in the presence of all the anions and cations that are to be present in the final clay. Example 8 is a process based on the Strese and Hofmann paper referred to above, particularly as described in pages 73 and 78 to 80 thereof. Example 9 is a similar process to Example 8, but using the quantities described in Example 2.

In all examples the cation exchange capacity of the products was measured by the method according to R. C. Mackenize, in J. Colloid Sci., 6, 216 (1951).

EXAMPLES

Example 1

130.7 g. magnesium sulphate heptahydrate and 2.97 g. lithium chloride were dissolved in 900 ml. water in a flask of about 5 l capacity and heated to boiling point. In a separate vessel 38.6 g. sodium carbonate was dissolved in 900 ml. water and 166 g. sodium silicate solution containing 29 g. $SiO_2$ and 8.8 g. $Na_2O$ per 100 g. was added to it. The second solution was added to the first, when it was observed that a white precipitate was formed. The mixture was brought to the boil under reflux while stirring efficiently. After boiling for two hours, the contents of the flask were transferred to an autoclave fitted with a stirrer, heated in ½–1 hour to 250° C. corresponding to a gauge pressure of 562 pounds per square inch, and held at that temperature for 4 hours, while being continuously stirred. The mixture was then allowed to cool below 100° C., discharged from the autoclave and the solids present were filtered and washed with tap water by filtration until the filtrate showed no significant sulphate reaction when tested with barium chloride solution. The filtercake was dried in an oven at 110° C. for 16 hours and ground to a powder.

The product had $M=Na^+$, $a=5.29$, $b=0.47$, $c=0.49$.

When 2 g. of the powder was dispersed in 100 ml. hot tap-water (containing 39 p.p.m. $Ca^{++}$ and 4 p.p.m. $Mg^{++}$) it was found that, after cooling, a white translucent gel was obtained. By using a rotational viscometer (Fann VG model), the following rheological parameters were measured on this dispersion:

Plastic viscosity—13 centipoises
Bingham Yield Value—72 dyne/cm.$^2$

The cation exchange capacity was found to be 0.59 milliequivalent per gram. X-ray analysis by the powder diffraction method showed that the structure corresponded to that of natural hectorite and no other crystalline material could be detected. Differential thermal analysis gave a pattern similar to that of natural hectorite having only endothermic peaks in the 600–800° C. range.

Example 2

The same procedure was followed as in Example 1, but altering the quantity of certain of the constituents. Thus there was employed 122.0 g. magnesium sulphate hexahydrate and 4.45 g. lithium chloride.

The product had $M=Na^+$, $a=5.03$, $b=0.63$, $c=0.78$.

The cation exchange capacity was 0.67 meq./g. X-ray analysis showed the same pattern as hectorite and differential thermal analysis in the 600–800° C., range showed only endothermic peaks.

A dispersion of 2 g. of the product in 100 ml. of hot tap-water gave after cooling an almost clear thixotropic gel giving a plastic viscosity of 18 centipoise and a Bingham Yield Value of 210 dyne/cm.$^2$.

The BYV of this dispersion was measured again after adding various amounts of sodium sulphate in the form of a concentrated solution. The following results were obtained:

| Amount of $Na_2SO_4$ added as milliequivalents per litre dispersion containing 2% synthetic clay: | BYV (dyne/cm.$^2$) |
|---|---|
| 10 | 400 |
| 20 | 520 |
| 30 | 550 |
| 40 | 565 |
| 60 | 520 |
| 100 | 400 |
| 150 | 180 |

Example 3

Again the same procedure was followed as in Example 1, but the amount of magnesium sulphate heptahydrate employed was 105.0 g. and the lithium chloride 7.42 g.

The product had $M=Na^+$, $a=4.63$, $b=0.82$, $c=1.42$, i.e., $b+c=2.24$.

A dispersion of 2 g. product in 100 ml. hot water gave after cooling a white opaque thixotropic gel having a plastic viscosity of 13 centipoise and a Bingham Yield Value of 38 dyne/cm.$^2$. The cation exchange capacity was 0.65 meq./g. X-ray analysis gave the hectorite pattern, but the diffraction lines were more diffuse than those given by the products of Examples 1 and 2. Differential thermal analysis showed both endothermic and exothermic peaks in the 600–800° C. range, the exothermic peak being sharp and relatively small compared with the endothermic peak.

Example 4

Again the same procedure was followed as in Example 1, but the amount of magnesium sulphate heptahydrate was 96.1 g. and the lithium chloride 8.90 g.

The product had $M=Na^+$, $a=4.42$, $b=0.92$, $c=1.71$ i.e., $b+c=2.63$.

When 2 g. of the product was dispersed in hot water, it was found that the solids settled almost immediately after stirring had ceased and no thixotropic gel could be obtained.

The cation exchange capacity was 0.69 meq./g. X-ray analysis gave a very diffuse hectorite like pattern with a high degree of scatter indicating poorly crystallised or amorphous material. Differential thermal analysis showed both exothermic and endothermic peaks between 600°–800°, the two types being of similar magnitude.

The amounts of chemicals used in Examples 1–4 were calculated to supply silicon, magnesium and lithium in the following atomic ratios:

| | Si | Mg | Li | Bingham yield value |
|---|---|---|---|---|
| Example: | | | | |
| 1 | 4 | 5.3 | 0.70 | 72 |
| 2 | 8 | 4.95 | 1.05 | 210 |
| 3 | 8 | 4.25 | 1.75 | 38 |
| 4 | 8 | 3.90 | 2.10 | 0 |

At the same time, the amount of sodium carbonate was calculated by the formula given below:

$$W = 0.882p \frac{(1.5r. - 1)}{r}$$

where W is the amount in grams of $Na_2CO_3$ required per 100 g. sodium silicate used, if the concentration of $SiO_2$ in the sodium silicate is $p$ percent (w./w.) and the molar ratio of $SiO_2$ to NaOH is $r$.

Example 5

The same procedure was followed as in Example 1, but the amount of magnesium sulphate heptahydrate was 139.3 g., no lithium chloride was employed and the employed and the amount of sodium carbonate was 42.5 g. The product had $M=Na^+$, $a=5.09$, $b=0$, $c=1.38$.

A dispersion of 2 g. product in 100 ml. hot water gave after cooling an almost clear colourless thixotropic gel having a plastic viscosity of 12 centipoise and a Bingham Yield of 95 dyne/cm.² The cation exchange capacity was 0.55 meq./g. X-ray analysis gave the typical hectorite pattern. Differential thermal analysis showed large exothermic and endothermic peaks in the 600–800° C. range.

The chemicals used in this example were calculated to supply silicon and magnesium in the atomic ratio of 8:5.65. The sodium carbonate added was that calculated by the formula given after Example 4, plus 10% excess.

Example 6

125.7 g. magnesium sulphate heptahydrate was dissolved in 630 ml. water and heated to boiling point. In a separate vessel 38.7 g. sodium carbonate was dissolved in 630 ml. water and 166 g. sodium silicate of the type used in the other examples was added to it over a period of 30 minutes. The mixture was boiled under reflux for two hours, then heated to 286° C. (corresponding to a gauge pressure of 1000 p.s.i.) and held at that temperature for 4 hours while being stirred. The subsequent treatment was the same as that used in all the previous examples.

The product had $M=Na^+$, $a=5.38$, $b=0$, $c=0.78$.

The rheological parameters of the product were:

Bingham Yield Value—152 dyne/cm.²
Plastic viscosity—13 centipoise
Cation exchange capacity—0.63 meq./g.

After adding some concentrated $Na_2SO_4$ solution to raise the electrolyte content of the solution to 45 meq./lt., the BYV rose to a maximum of 382 dyne/cm.²

Example 7

In this example, initially the same procedure was followed as in Example 2, but the amount of water used for making up the two solutions was 630 ml. instead of 900 ml. The slurry containing the precipitate was heated as rapidly as possible to 336° C. Corresponding to 2000 p.s.i. (total heating time from boiling point 2¾ hours), and immediately cooled as rapidly as possible by standing the autoclave in cold water. The product was then treated as all other preparations and it was found that it had the following properties:

BYV—40 dyne/cm.²
p.v.—5 centipoise

The maximum BYV at optimum electrolyte concentration was 475 dyne/cm.² The cation exchange capacity was 0.70 meq./g.

Example 8

122 g. magnesium sulphate heptahydrate was dissolved in 450 ml. water and in another vessel 166 g. sodium silicate solution of the kind used in Examples 1–5 was mixed with 450 ml. water. The second solution was added to the first and the resulting precipitate was washed by filtration till it was sulphate free. It was then dried at 110° C. for 16 hours, ground and subsequently mixed with 600 ml. of 2 N solution of sodium hydroxide. The resulting mixture was transferred to an autoclave and heated for 36 hours at 240°. After cooling, the solids were washed by filtration until the filtrate was almost free from alkali; finally the product was dried at 110° C. and ground.

When 2 g. of the product was dispersed in hot water, it was found that part of the material settled almost immediately, while the remainder formed after cooling a white opaque weak gel having a plastic viscosity of 6 centipoise and a Bingham Yield Value of 14 dyne/cm.² The cation exchange capacity was 0.55 meq./g. X-ray analysis gave a complex pattern containing faint and diffuse lines of hectorite and much stronger and sharper lines of at least one other crystalline substance, mainly quartz. Differential thermal analysis showed only small exothermic and endothermic peaks between 600°–800° C.

The amount of chemicals used in this preparation correspond to a Si/Mg atomic ratio of 1.6. The amount of sodium hydroxide is considerably higher than the equivalent amount of sodium carbonate calculated according to this formula given after Example 4.

Example 9

In this experiment, the same amounts and types of chemicals were used as in Example 2, while the method followed was the same as in Example 8. Thus the magnesium sulphate and sodium silicate solutions were mixed to form a precipitate which was then washed, dried and redispersed in 600 ml. solution containing the sodium carbonate and lithium chloride. After autoclaving, washing, drying and grinding, as in Example 8, the product was tested and gave very similar results to Example 8.

Plastic viscosity at 2% conc.—10 centipoises
Bingham Yield Value at 2% conc.—14 dynes/cm.²
Cation exchange capacity—0.69 meq./g.
X-ray analysis—weak hectorite, strong quartz pattern.
DTA—as Example 8.

All the synthetic clay-like minerals discussed in detail above have an inorganic cation M, but useful derivatives in which the cation is organic may be made. Thus the inorganic materials may be converted into new synthetic clay mineral organophilic products in which at least some of the exchangeable cations consist of one or more organic cations endowing it with an organophilic nature. These new organophilic products may be prepared by reacting one of the new synthetic clay minerals, either before washing, after washing or after drying, in a liquid, preferably aqueous, medium with an organic compound or salt thereof which gives rise in the medium to an organic cation capable of undergoing a cation exchange reaction with the synthetic clay. Preferably at least a major part of the exchangeable cations in the organophilic product are of the specified organic cations.

Examples of organic compounds or salts thereof from which such cations may be derived are to be found among the following classes: organic ammonium, organic phosphonium, organic stibonium, organic arsonium, organic oxonium, organic sulphonium.

In general, the cations of prime importnace as far as the present invention is concerned are based on nitrogen, i.e. the organic ammonium salts. By way of example this class of compounds include the salts (including quaternary salts) of primary, secondary and tertiary amines, including mono-, di-, tri and polyamines as well as aliphatic, aromatic, cyclic and heterocyclic amines and substituted derivatives thereof. Other mono- or polyvalent compounds which are of particular value in the practice of the present invention are the so-called "Ethomeens" (Armour & Company Ethomeen is a trademark). These compounds may be regarded as tertiary amines having a single alkyl group and two polyoxyethylene groups attached to the nitrogen atom. Similarly the so-called "Ethoduomeens" (Armour & Company) are also of value.

Preferably, the organic radical present has at least ten carbon atoms, desirably at least twelve and advantageously at least eighteen. The compounds may have up to 30, 40 or even 50 or more carbon atoms depending on the availability of such materials.

Specific examples of suitable organic ammonium cations are dimethyl dioctadecyl ammonium, trimethyl octadecyl ammonium, dodecyl ammonium, hexadecyl ammonium, octadecyl ammonium, dioctadecyl morpholinium, 1-propyl-2-octadecyl imidiazolinium and bis(-2-hydroxyethyl)octadecyl ammonium. These may be used singly or in combinations in order to produce an organo silicate of desired properties.

When substantially complete cation exchange is desired, it is preferred to employ from 0.9 to 1.4 equivalents of the organic cation, although on occasions it is found very adavntageous to employ as much as 1.7 to 1.8, even up to 2.2 equivalents. However, when the clay has been synthesised at the higher pressures, viz. 700 to 1000 p.s.i., the above-quoted range may be respectively, 0.6 to 1.4 and 1.0 to 2.2 equivalents.

The product can be separated by the usual steps of dewatering and drying, and then finally ground if desired. Normally the product will also be washed.

The processes described can employ as starting material the dried synthetic clay. However, when, as is preferred, the reaction is carried out in an aqueous medium, it is clearly advantageous to employ the aqueous slurry, or cake-like mass, without heat treatment.

Certain cation-modified clays in accordance with this invention possess oleophilic and gelling properties making them very useful materials in the preparation of, for example, lubricating greases. Others possess the ability to form organosols.

The following Examples 10 to 14 are some examples of the preparation of organic derivative of the new materials according to the invention.

Example 10

11.25 gal. water was heated in the autoclave to boiling point and 21.8 lb. magnesium sulphate heptahydrate and 0.8 lb. lithium chloride were dissolved in it. A separate solution was made up consisting of 11.25 gal. water with 29.6 lb. sodium silicate of the type used in all other examples and 10.4 lb. anhydrous sodium carbonate. The second solution was gradually added to the first solution in the autoclave over a period of one hour. The mixture was then boiled at atmospheric pressure under continuous stirring for two hours, after which period the autoclave was sealed and heated to 207° C. (250 p.s.i. pressure) in 4½ hours. The same temperature and pressure was maintained for 8 hours, then the heating was stopped and the mixture was allowed to cool below 100° C. It was then discharged from the autoclave.

1000 g. of the unwashed slurry from the autoclave containing 60 g. synthetic clay was diluted with 2 litre hot water. A solution of 50.8 g. (1.1 equivalents) of the material sold under the tradename Arquad 2HT—75% T (which material is dimethyl dioctadecyl ammonium chloride of 75% concentration in isopropanol) in 1.5 litre hot water was added to it under vigorous stirring. The mixture was heated to boiling point when it was observed that the dispersed solids were flocculated and settled on standing. The settlement was filtered under vacuum, washed with hot water until the filtrate was substantially free of chloride and dried at 80° C. for 2 hours. A soft pulverulent product was obtained which was easily ground to a fine powder suitable for use in manufacturing a grease.

Example 11

The same procedure was followed as in Example 10 the only difference being that the autoclaving was continued for 24 hours. The resultant soft pulverulent product was even more suitable for use in manufacturing a grease.

Example 12

The same procedure was followed as in Example 10 with the exception that the slurry from the autoclave was washed by filtration until the filtrate was substantially free from sulphate. The filter cake was dried at 120° C. for 8 hours and finally ground, 60 g. of the dried solids were dispersed in 3 lt. hot water by mixing for 15 minutes and mixed with a solution of 50.8 g. Arquad 2HT, continuing the preparation as described in Example 10.

Again a soft pulverulent product was obtained which was easily ground to a fine powder suitable for use in manufacturing a grease.

Example 13

The same procedure was followed as in Example 10 with the exception that 74 g. (1.7 equivalent) of the Arquad 2HT was used. In this case the resultant product was suitable for the production of an organosol.

Example 14

The product obtained in Example 6 was converted to organophilic form by dispersing 15 g. dry clay in 150 ml. hot water, adding a solution of 11.6 g. Arquad 2HT in 375 ml. hot water and continuing the preparation as described in Example 10.

The product was dispersed in a low viscosity lubricating oil and it was found that at 8–10% concentration stiff greases were obtained, similar in consistency to the lubricating greases in commercial use.

In general greases can be prepared by blending the organic ammonium clay-derivatives, in suitably finely divided form, with a wetting agent and a grease-base oil. The blending is preferably conducted as a milling operation and is advantageously in two steps, the first with a part of the required amount of grease-base oil, the second with the remainder. Finally the grease may be centrifuged to facilitate removal of trapped air bubbles.

The greases comprise, in general, a major amount of grease-base oil and a minor amount, conveniently 2 to 29% by weight (suitably 5–15% and preferably 10%), of the organic clay-derivative.

The following Examples 15 and 16 illustrate respectively the making of certain organic clay-derivatives and the use of those materials in the manufacture of greases:

Example 15

174 g. of light spindle oil (grade Carnea 21) was mixed with 4 g. methyl alcohol and 29 g. of the powder prepared previously in accordance with Example 10, was added to it. The mixture was stirred with a high shear mixer for 3 minutes, then passed through a colloid mill the shearing surfaces of which were set at 0.05 mm. clearance. After passing through the mill, 150 g. of the grease obtained, having a solids content of 14%, was mixed with 60 g. of the same kind of light spindle oil as used before, to reduce the solids content to 10%, and the mixture was once again passed through the colloid mill. After that, the grease obtained was centrifuged to facilitate the removal of trapped air bubbles. The consistency of the grease was tested by a Gellenkamp miniature pentrometer using a cone of solid angle 90° C. and having a total weight of 15.3 g. A value of 30 (one-tenth millimetre units) was obtained.

Example 16

In the preparation of organosols in accordance with the invention the organic ammonium compound employed for reaction with the synthetic swelling clay preferably has a chain of at least 18° C. atoms and is used in an amount of at least 1.5 equivalents (preferably not more than 2.2) and suitably between 1.7 and 1.8. However, if the synthetic clay has been prepared at higher pressures, viz 700 to 1000 p.s.i., then the amount of ammonium compound employed can be as little as 1.0 equivalent.

As the result, the product has substantially the whole of its exchangeable cations as organic cations. The remainder of the cations involved in the reaction (i.e. the 50% or more excess) are retained by the clay. The anion from the organic compound is not retained.

It seems that multilayer deposition of organic matter has taken place on the silica layer of the synthetic clay structure.

Such organic products are able to form organosols with liquid aliphatic and aromatic hydrocarbons, especially petroleum ether, white spirit, benzene, toluene and xylene. They are organosols with a disperse phase of substantial inorganic content. When the organosol is mixed with water or an aqueous solution and shaken, it forms an aqueous emulsion in which, generally, the organic liquid is the outer phase.

By way of example, an organic clay-derivative was prepared in accordance with Example 10 above but employing 74 g. (1.7 equivalents) of the amine.

The product was wetted with methyl alcohol and dispersed in toluene at 8% concentration. A clear sol of low viscosity was formed. The sol was stable between 0° C. and 100° C. When part of this sol was mixed with half of its volume of water and shaken for one minute, a stiff emulsion was obtained in which the outer phase was toluene.

Natural hectorite does not form sols or water/organic solvent emulsions.

The inorganic swelling clays of the invention, i.e. those where M is Na or Li can be used on their own but ease of introduction into various media can be facilitated by use of a peptising agent.

Thus in accordance with a further feature of the invention, the inorganic clays having the general formula quoted when M is Na or Li, may be formed into a composition with up to 25% (by weight of the material) of one or more peptizers selected from alkali metals salts having polyvalent anions. Preferably the cation M of the material is Na+ or Li+. Alternatively organic materials can be employed as peptising agents, for example, quebracho or a lignosulphonate.

Preferably the quantity of peptizer present is from 3% to 12% (by weight of the clay), suitably from 5 to 10%, and advantageously 5% or 6%. These quantities are especially suitable when the peptizer is tetrasodium pyrophosphate.

Among other peptizers which may be employed are the product sold under the trade name "Calgon" and sodium tri-poly-phosphate. In general the most suitable peptizers are sodium salts having polyvalent anions, which anions are capable of forming either complex or insoluble salts with magnesium.

These compositions can be conveniently prepared by dry-blending the synthetic clay-like mineral and the peptizer. Particle size of the resultant blend is not critical, being chiefly dependent upon the use to which the blend is to be put.

It may be found desirable on occasions for the compositions to contain also small amounts of one or more additives, the nature of which will be dictated by the use to which the final composition is to be put.

Certain of the compositions, for example those in which the cation M is Na+ or Li+, have the unexpected property of possessing the ability to form substantially transparent colloidal dispersions in the form of sols when mixed with water. Aqueous sols, whether made from these compositions themselves, or directly from the constituents of them, represent a further feature of the present invention, and can have a total solids content (synthetic material+peptizer) of up to about 10% although normally from 2 to 6% is a convenient solids content. Such sols cannot be obtained from naturally occurring swelling clays. In practice the sols provide an easy method of introducing the synthetic swelling clay into the medium in which that clay is required.

Although dilute aqueous dispersions of the kind just described do not show any thixotropy or appreciable Bingham Yield Value, both these properties may be developed by mixing with specific reagents. Such a property renders composition and/or sols in accordance with this invention especially suitable for use in emulsion paint media, for example polyvinyl acetate paint medium.

Indeed it is found that in this connection the compositions are very effective gelling agents, as also are the lithium-containing clays when employed without the peptising agent.

A further application of the synthetic clays, and blends thereof with a peptising agent, lies in the bonding of foundry sands.

Samples of the sodium form clays, alone and with 6% tetrasodium pyrophosphate were taken. 5 parts of each wert mixed with 100 parts of silica and 3.5 parts of water, and then milled for 5 mins.

A commercially available grade of a natural swelling clay was treated in the same way.

It was found that the two synthetic-clay containing sand-mixes had green strengths 50% better than that of the natural clay sand-mix. The refractoriness (as measured by their fusion temperatures in an electric refractory furnace) of all samples was substantially equal, at approximately 1300° C.

A further very important feature of the invention lies in a further application of the mixtures of inorganic swelling clay and peptiser just described. Starting with such mixtures—or the separate ingredients—very useful grouting compositions can be obtained.

According to this feature of the invention a grouting composition comprises in admixture (a) Cement
(b) Fly ash and/or other filler
(c) Up to a total of 5% by weight (of the total weight of (a)+(b)) of one or more of the synthetic inorganic clay materials described in our British specification No. 1,054,473 and/or in copending application 40,683/66, and
(d) Up to a total of 5% by weight (based on weight of (c)) of one or more peptizers selected from alkali metal salts having polyvalent anions.

Suitably the ratio of cement to filler is in the range 1:4 to 1:1; desirably in the range 1:3 to 1:2, and preferably about 1:2.3.

Desirably the synthetic clay material is present in the mix up to about 1% by weight of the total of (a)+(b), advantageously from 0.1% to 0.5% by weight.

The total amount of peptizer employed is suitably in the range 1%–4% by weight of (c); about 2% being an advantageous quantity.

Such compositions are useful in tunnelling through soft ground; for sealing embankments, rock fissures, and boreholes; and in the construction of diaphragm walls and other permanent water-barriers.

Important properties of grouting compositions, especially those for use in tunnelling are (i) easy mixing with water or other suitable liquid medium to form a pumpable slurry, (ii) initial set in about one hour, (iii) plastic condition up to 12–16 hours, (iv) final set in 12–24 hours, (v) final strength 200–800 lb./sq. in., (vi) little or no shrinkage during setting, (vii) little or no separation of water during setting, (viii) no segregation of solids in set cement, (ix) fine pore structure.

Generally similar requirements apply if, instead of being used as a grout, the composition is used to form pre-cast tunnel lining segments. In this case, however, the final setting time (for removability from the mould) has to be shorter and the final strength higher.

The grouts employed in tunnelling etc. are, essentially, aqueous mixtures of cement, filler and a swelling clay. However, in all known cases the swelling clay must be pre-gelled before it can be used, and this involves a separate step in the preparation of an aqueous grout. Ideally a dry-mix of all the components is required, to which only water need be added to form the aqueous grout.

It is, therefore, a very important feature that such a dry-mix is now possible.

One especially advantageous grout composition in accordance with the invention contains (in parts by weight) fly ash—70, cement—30, synthetic clay material—0.12, and TSPP—2% based on weight of synthetic clay.

Fly ash is power-station pulverised fuel ash (B.S.S. 3892:1965).

In making an aqueous grout from the dry mix normally some 35 to 55 parts by weight of water will be required. With the particular composition referred to in the previous paragraph, some 40–45 parts are suitable, depending upon the fineness of the filler, particularly when this is fly ash.

The following example illustrates this feature of the invention:

Example 17

In the table which follows comparison of the results obtained should be made with nine properties listed above.

Various terms are employed in the results quoted below, and these terms have the following meanings:

Consistency

A—The freshly mixed grout is thick, stirrable by glass rod, but not pourable.
B—Just pourable from beaker as a continuous mass.
C—Thin paste.

Fluid loss.—The moulds were stood on adsorbent paper and any fluid separated during the initial setting period was shown as a wet patch around the base.

A—None
B—Trace
C—Some
D—Much

Revobability from mould.—After 1 hour an attempt was made to remove the specimen from the mould. Yes means that the specimen did not seem to deform or slump down. Just, that it deformed slightly, but could be left to stand safely by leaning against a support. Further comments are obvious.

Penetration.—This was measured on the surface of the specimen after 1 hour, using a plastic cone weighing 15.4 g. and having 45° half solid angle. Yield strength was calculated as follows:

$$S = \frac{1750}{p^2} \text{ lb./sq. in.}$$

where $p$=penetration in 1/10 mm. units, as read.

Loss of shape.—Deformation during the setting period was noted as follows:

A=no detectable change
B=very little deformation
C=quite noticeable deformation
D=considerable deformation
E=no shape (not removable after 1 hour).

Texture.—The specimens had to be cut at both ends to make 3″ tall cylinders for the measurement of strength by a triaxial shear tester. At the same time, the fineness of the pore texture was noted.

A=very good, uniform fine pores
B=good
C=fair
D=poor (some very large pores)
E=no specimen (not removable after 1 hour).

For the experiments tabulated, the dry grout compositions were first formed and then water was added gradually under continuous mixing until the desired consistency level was obtained. The resultant aqueous grouts were filled into cylindrical specimen moulds of 1½″ diameter, lined with thin rubber sheaths.

The following tables show the effect of addition of synthetic clay, with or without TSPP, on the properties of portland cement/fly ash, and having different initial consistencies.

Table I contains information on the behaviour of one particular type of synthetic clay (Type 2). Table II shows the effect of employing a different type of synthetic clay (Type I) and two proprietary brands of natural hectorite sold under the trade names "Ben-A-Gel," and "Ben-A-Gel EW."

A blank space in the tables indicates that no measurement was taken.

TABLE I

| Cement: Fly ash | Synthetic clay percent on dry wt. | TSPP percent on synth. clay | Water percent on dry wt. | Consistency | Fluid loss | Removability after 1 hour | Penetration strength (lb./sq. in.) after 1 hr. | Loss of shape | Texture | Shear strength (lb./sq. in.) after — 1 day | Shear strength (lb./sq. in.) after — 7 days | Variable |
|---|---|---|---|---|---|---|---|---|---|---|---|---|
| 50:50 | .12 | 2 | 45 | C | C | No | 2.4 | E | E | | | Cement:fly ash. |
| 40:60 | .12 | 2 | 45 | C | B | Just | 0.6 | B | B | 525 | 1,725 | |
| 30:70 | .12 | 2 | 45 | C | A | ---do | 1.0 | B | A | 210 | 1,410 | |
| 25:75 | .12 | 2 | 45 | C | B | ---do | 1.0 | B | A | 0 | 1,130 | |
| 20:80 | .12 | 2 | 45 | C | C | ---do | 0.9 | B | A | 0 | 546 | |
| 10:90 | .12 | 2 | 45 | C | D | ---do | 0.6 | D | | 0 | 0 | |
| 30:70 | 0 | 0 | 40 | A | A | No | 0.9 | E | E | | | Clay content consistency. |
| 30:70 | 0 | 0 | 42.5 | B | A | No | 0.5 | E | E | | | |
| 30:70 | 0 | 0 | 45 | C | A | No | 0.2 | E | E | | | |
| 30:70 | .04 | 0 | 35 | A | A | Just | 2.8 | B | C | 420 | | |
| 30:70 | .04 | 0 | 40 | B | A | No | 0.6 | E | E | | | |
| 30:70 | .04 | 0 | 45 | C | B | No | | E | E | | | |
| 30:70 | .12 | 0 | 35 | A | A | Just | 6.0 | C | C | 420 | 1,870 | |
| 30:70 | .12 | 0 | 40 | B | A | ---do | 0.6 | C | A | 105 | 1,365 | |
| 30:70 | .12 | 0 | 45 | C | B | ---do | | B | A | 63 | 923 | |
| 30:70 | .20 | 0 | 37.5 | A | C | ---do | 1.6 | D | B | 378 | 1,700 | |
| 30:70 | .20 | 0 | 40 | B | C | Not quite | 1.9 | E | E | | | |
| 30:70 | .20 | 0 | 45 | C | C | ---do | | E | E | | | |
| 30:70 | .12 | 0 | 40 | B | A | Just | 0.6 | C | A | 105 | 1,365 | TSPP:consistency B. |
| 30:70 | .12 | 1 | 42.5 | B | B | ---do | 3.0 | C | A | 126 | | |
| 30:70 | .12 | 2 | 43.5 | B | B | ---do | 3.6 | C | A | 147 | | |
| 30:70 | .12 | 4 | 43.5 | B | B | ---do | 3.9 | C | A | 126 | | |
| 30:70 | .12 | 6 | 43.5 | B | B | ---do | 3.9 | C | A | 105 | | |
| 30:70 | .12 | 0 | 45 | C | A | Just | | B | A | 63 | 923 | TSPP:consistency C. |
| 30:70 | .12 | 1 | 45 | C | A | ---do | | B | A | 189 | | |
| 30:70 | .12 | 2 | 45 | C | A | ---do | | B | A | 147 | | |
| 30:70 | .12 | 4 | 45 | C | A | ---do | | B | A | 126 | | |

TABLE II

| Cement: Fly ash | Synthetic clay percent on dry wt. | TSPP percent on synth. clay | Water percent on dry wt. | Consistency | Fluid loss | Removability after 1 hour | Penetration strength (lb./sq. in.) after 1 hr. | Loss of shape | Texture | Shear strength (lb./sq. in) after— 1 day | 7 days | Variable |
|---|---|---|---|---|---|---|---|---|---|---|---|---|
| | BEN-A-GEL | | | | | | | | | | | |
| 30:70 | .06 | 0 | 46 | C | D | No | .4 | D | A | 84 | 630 | |
| 30:70 | .12 | 0 | 46 | C | D | No | .5 | D | A | 105 | | |
| 30:70 | .20 | 0 | 46 | C | D | No | .1 | D | A | 53 | 525 | |
| 30:70 | .30 | 0 | 46 | C | D | No | .2 | D | A | 42 | 335 | Different clays. |
| 30:70 | .12 | 1 | 46 | C | D | No | | D | A | 63 | 525 | |
| 30:70 | .12 | 2 | 46 | C | D | No | | D | A | 63 | 735 | |
| 30:70 | .30 | 2 | 46 | C | D | No | .2 | D | A | 63 | 63 | |
| 30:70 | .30 | 4 | 46 | C | D | No | .2 | D | | 0 | 21 | |
| | BEN-A-GEL-EW | | | | | | | | | | | |
| 30:70 | .06 | 0 | 45 | C | D | No | | D | A | 116 | | |
| 30:70 | .12 | 0 | 46 | C | D | No | | D | A | 147 | | |
| 30:70 | .2 | 0 | 46 | C | D | No | | D | A | 168 | | |
| 30:70 | .3 | 0 | 46 | C | D | No | .2 | D | A | 126 | | Different clays. |
| 30:70 | .12 | 1 | 46 | C | D | No | .6 | D | A | 126 | 525 | |
| 30:70 | .12 | 2 | 46 | C | D | No | .3 | D | A | 168 | 735 | |
| 30:70 | .30 | 1 | 46 | C | D | No | .1 | D | A | 63 | 525 | |
| 30:70 | .30 | 2 | 46 | C | D | No | .5 | D | A | 21 | 714 | |
| 30:70 | .30 | 4 | 46 | C | D | No | .2 | D | A | 21 | | |

Conclusions which can be drawn from the above table are that:

The addition of the synthetic clays improves the setting behaviour of the grout in the sense that mixtures, which are initially thin and pumpable, set sufficiently well in one hour to be removed from the mould, yet remain plastic for nearly a day. Such mixtures do not set in one hour without the synthetic clay. The optimum content is about 0.12% on dry weight basis.

With the addition of 0.12% synthetic clay, mixtures of varying cement/fly ash ratio, down to about 25–30% cement content can give generally satisfactory results. If even lower proportion of cement is used, the grout still sets very well in one hour, but is too weak after 24 hours.

Natural hectorite (Ben-a-Gel and Ben-a-Gel-EW) used in 30:70 cement/fly ash mixes causes some improvements of setting behaviour, but not sufficiently to give a mix which sets in one hour. The optimum addition is about 0.12% as for synthetic clay, but addition of phosphate results in no further advantage. Other advantages of the synthetic clay compositions are (a) smaller fluid loss and (b) less deformation after removal from the mould during the first day.

Clay 2 is a synthetic clay prepared in accordance with Example 2 herein.

I claim:

1. A process for the synthesis of an end product which is a synthetic silicate having a structure similar to that of clay minerals of the smectite type and having the general structure:

$$(Si_8Mg_aLi_bH_{4+c}O_{24})^{(12-2a-b-c)-}M^+(12-2a-b-c)$$

wherein:

(1) M is sodium or lithium and
(2) the value of $a$, $b$ and $c$ are such that either $a<6$; $b>0$; $c>0$; and $b+c<2$; $\pm(a+b+c-6)<2$; or $a<6$; $b=0$; $\pm c<2$; and $\pm(a+c-6)<2$;

said end product having the following characteristics:
(a) a cation exchange capacity of about 50 to 120 meq./100 g.; and
(b) a Bingham Yield Value of at least about 50 dynes/cm.² as a 2% dispersion in tap-water;

said process comprising
(i) a coprecipitating a precipitate from a reaction medium containing all of the cations and anions desired in the product in their requisite amounts to give the desired values of $a$, $b$ and $c$ in the product by combining an aqueous solution comprised of a magnesium salt with an aqueous solution comprising a silicate, said reaction medium containing sufficient alkali to maintain the pH of the reaction medium at 8–12.5 throughout said co-precipitation;
(ii) without first drying or washing the precipitate, heating it at a pressure of at least 100 p.s.i. when lithium is present and, when lithium is not present, at a pressure of at least 250 p.s.i., for a period of time sufficient to cause crystallization but insufficient to cause a degree of crystallization which adversely and substantially affects the rheological properties of aqueous dispersions of said product; and
(iii) separating the resultant solid and liquid phases.

2. A process in accordance with claim 1 wherein said alkali employed to maintain the pH of the reaction mixture throughout said co-precipitation is sodium carbonate or sodium hydroxide.

3. A process as claimed in claim 2, in which the combination of the said silicate solution with the said magnesium salt solution is conducted in the presence also of an aqueous solution of a lithium salt.

4. A process as claimed in claim 2, comprising the additional step of washing the solid phase of step (iii) to remove soluble by-products.

5. A process for the synthesis of an organophilic end product which is a synthetic silicate having a structure similar to that of clay minerals of the smectite type and having the general structure:

$$(Si_8Mg_aLi_bH_{4+c}O_{24})^{(12-2a-b-c)-}M^+(12-2a-b-c)$$

wherein:

(i) M is an equivalent of an organic cation; and
(ii) the value of $a$, $b$ and $c$ are such that either $a<6$; $b>0$; $c>0$; and $b+c<2$; $\pm(a+b+c-6)<2$; or $a<6$; $b=0$; $\pm c<2$; and $\pm(a+c-6)<2$;

said process comprising reacting the synthetic clay end product formed by the process of claim 1, with or without first separating the said resultant solid and liquid phases, with an organic compound which gives rise to an organic cation capable of undergoing a cation exchange reaction with said synthetic clay end product.

6. A process according to claim 5 wherein said reaction is carried out in an aqueous reaction medium.

7. A process according to claim 5 wherein at least a major part of the exchangeable cations in said organophilic end product are said organic cations.

8. A process according to claim 5 wherein said organic compound is an organic amine salt having the organic cation M such that M is an organic ammonium cation.

9. A process according to claim 5 wherein the alkali employed to maintain the pH during said coprecipitation step is sodium carbonate or sodium hydroxide.

10. A process as claimed in claim 8 wherein the organic ammonium cation M has at least 10 carbon atoms.

11. A process as claimed in claim 8 wherein said organic ammonium cation has at least 18 carbon atoms.

12. A process according to claim 8 wherein the organic ammonium cation is dimethyl dioctadecyl ammonium.

13. A synthetic silicate product having a structure similar to that of clay minerals of the smectite type; and having a cation exchange capacity of about 50 to 120 meq./100 g.; and a Bingham Yield Value of at least about 50 as a 2% dispersion in tap water produced by the process of claim 1.

14. A synthetic organophilic silicate having a structure similar to that of clay minerals of the smectite type produced by the process of claim 5.

References Cited

UNITED STATES PATENTS 2,531,427 11/1950 Hauser _____ 260—448
2,966,506 12/1960 Jordan _____ 260—448

OTHER REFERENCES

Granquist et al.: "Clay and Clay Minerals," Proceedings of the Eight Nat. Conf. on Clays and Clay Minerals, copyright 1960, pp. 150–169.

EDWARD J. MEROS, Primary Examiner

U.S. Cl. X.R.

23—113; 106—71; 260—448 C